(12) United States Patent
Lassanske et al.

(10) Patent No.: US 6,868,976 B1
(45) Date of Patent: Mar. 22, 2005

(54) SUPPORT STAND FOR A BICYCLE

(75) Inventors: Todd W. Lassanske, Madison, WI (US); Chang Shin Pin, Taipei (TW)

(73) Assignee: Graber Products, Inc., Madison, WI (US)

( * ) Notice: Subject to any disclaimer, the term of this patent is extended or adjusted under 35 U.S.C. 154(b) by 0 days.

(21) Appl. No.: 10/264,779

(22) Filed: Oct. 4, 2002

(51) Int. Cl.$^7$ ................................................ A47F 7/00
(52) U.S. Cl. .......................................... 211/22; 211/21
(58) Field of Search ................................ 211/5, 20, 21, 211/22, 17–19, 23, 24; 224/42.12, 42.13, 42.15, 42.21; D12/115; 248/149, 150, 354.7, 346.01, 346.03, 500, 127; 157/14

(56) References Cited

U.S. PATENT DOCUMENTS

| | | | | | |
|---|---|---|---|---|---|
| 529,827 | A | * | 11/1894 | Fonda ........................... | 211/22 |
| 581,585 | A | * | 4/1897 | Hirschman et al. ............ | 211/21 |
| 590,443 | A | * | 9/1897 | Temple ......................... | 211/21 |
| 592,086 | A | * | 10/1897 | Frambes ....................... | 211/21 |
| 631,665 | A | * | 8/1899 | Potter ............................ | 211/5 |
| 3,724,844 | A | * | 4/1973 | Olmstead et al. ............. | 482/61 |
| 3,785,500 | A | * | 1/1974 | Kennelly ...................... | 211/5 |
| 3,912,139 | A | * | 10/1975 | Bowman ....................... | 410/3 |
| 4,262,899 | A | * | 4/1981 | Alvarez ........................ | 482/61 |
| 4,460,498 | A | * | 7/1984 | Giersch et al. ................ | 512/8 |
| 4,629,104 | A | * | 12/1986 | Jacquet ........................ | 224/324 |
| 4,733,810 | A | * | 3/1988 | Graber et al. ................ | 224/329 |
| 4,856,659 | A | * | 8/1989 | Krebs ........................... | 211/24 |
| 5,417,629 | A | * | 5/1995 | Phipps ......................... | 482/61 |
| 5,498,015 | A | * | 3/1996 | Trout et al. .................. | 280/293 |
| 5,607,064 | A | * | 3/1997 | Fourel .......................... | 211/5 |
| 5,611,472 | A | * | 3/1997 | Miller ......................... | 224/403 |
| 6,193,078 | B1 | * | 2/2001 | Stuhlmacher ................ | 211/20 |
| 6,488,157 | B2 | * | 12/2002 | Chen ........................... | 211/20 |

OTHER PUBLICATIONS

"RAKK—Bicycle Maintenance And Storage Stand", www.ussbike.com, (2 pages), Feb. 5, 2002.
"Willworx Super Stands", p. 106, The Hawley Company, undated.
"Display Stands", p. 106, The Hawley Company, undated.
"Accessories/Racks: Bike Display & Parking", p. 40, QBP, undated.
"The Grand Stand" Product Card, Alta Design & Development, San Diego, CA, undated.

* cited by examiner

Primary Examiner—Jennifer E. Novosad
(74) Attorney, Agent, or Firm—Boyle, Fredrickson, Newholm, Stein & Gratz, S.C.

(57) ABSTRACT

A support for a bicycle having at least one wheel includes a pair of axially spaced apart base members, and a pair of laterally spaced apart support members which extend upwardly from and which are interconnected with the base members. The bicycle wheel is adapted for placement between the support members, which are configured to support the bicycle in an upright position. Engagement of the bicycle wheel with the base members prevents the bicycle wheel from rolling, to maintain the bicycle in engagement with the support. A variable position engagement arrangement is provided between at least one of the support members and the base members, to enable adjustment in the lateral spacing between the support members so as to accommodate different wheel widths. The support members may be formed of pivotably interconnected sections, which enable the support to be moved between an extended position for use and a collapsed position for shipment, transport or storage.

20 Claims, 7 Drawing Sheets

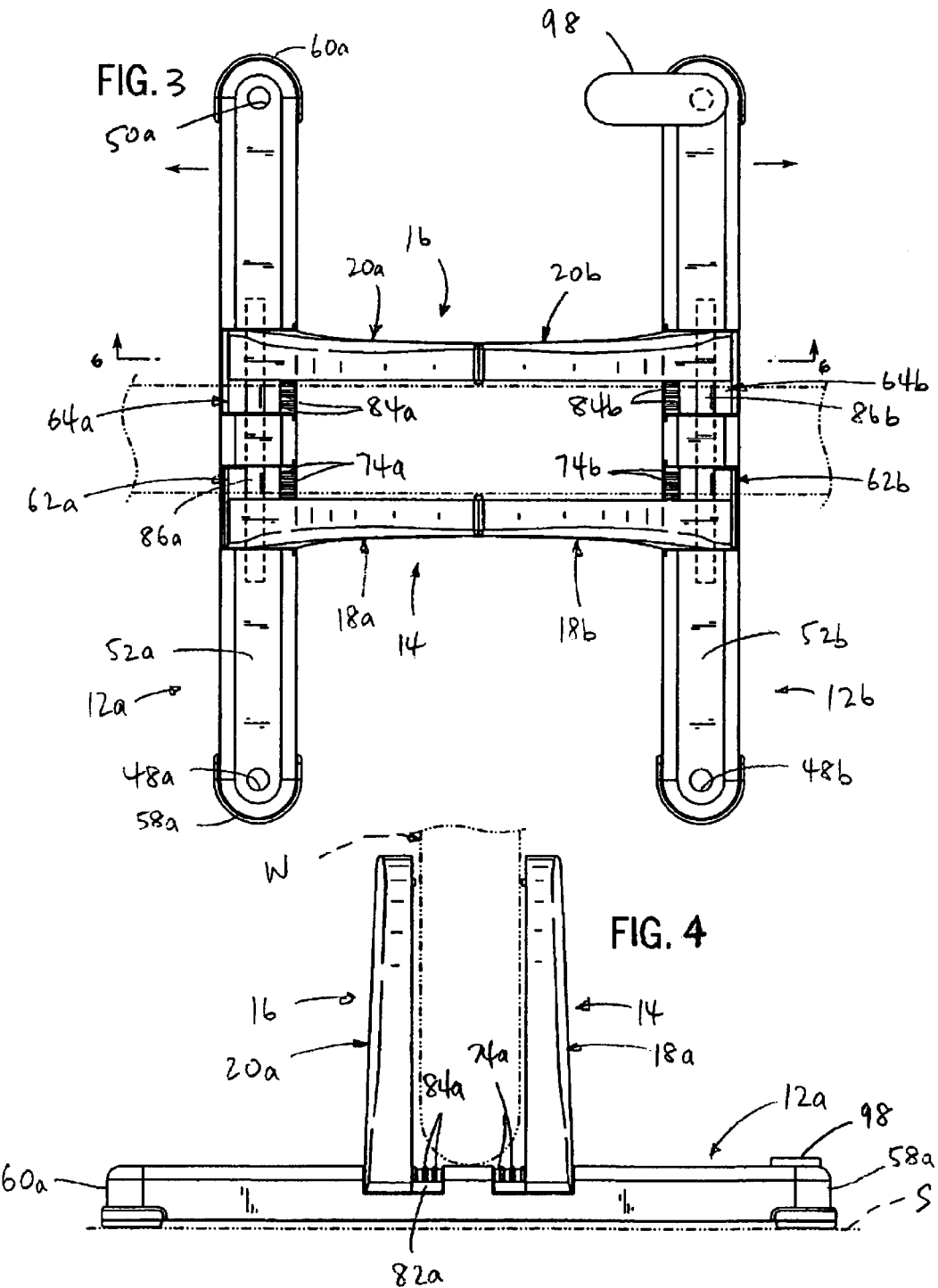

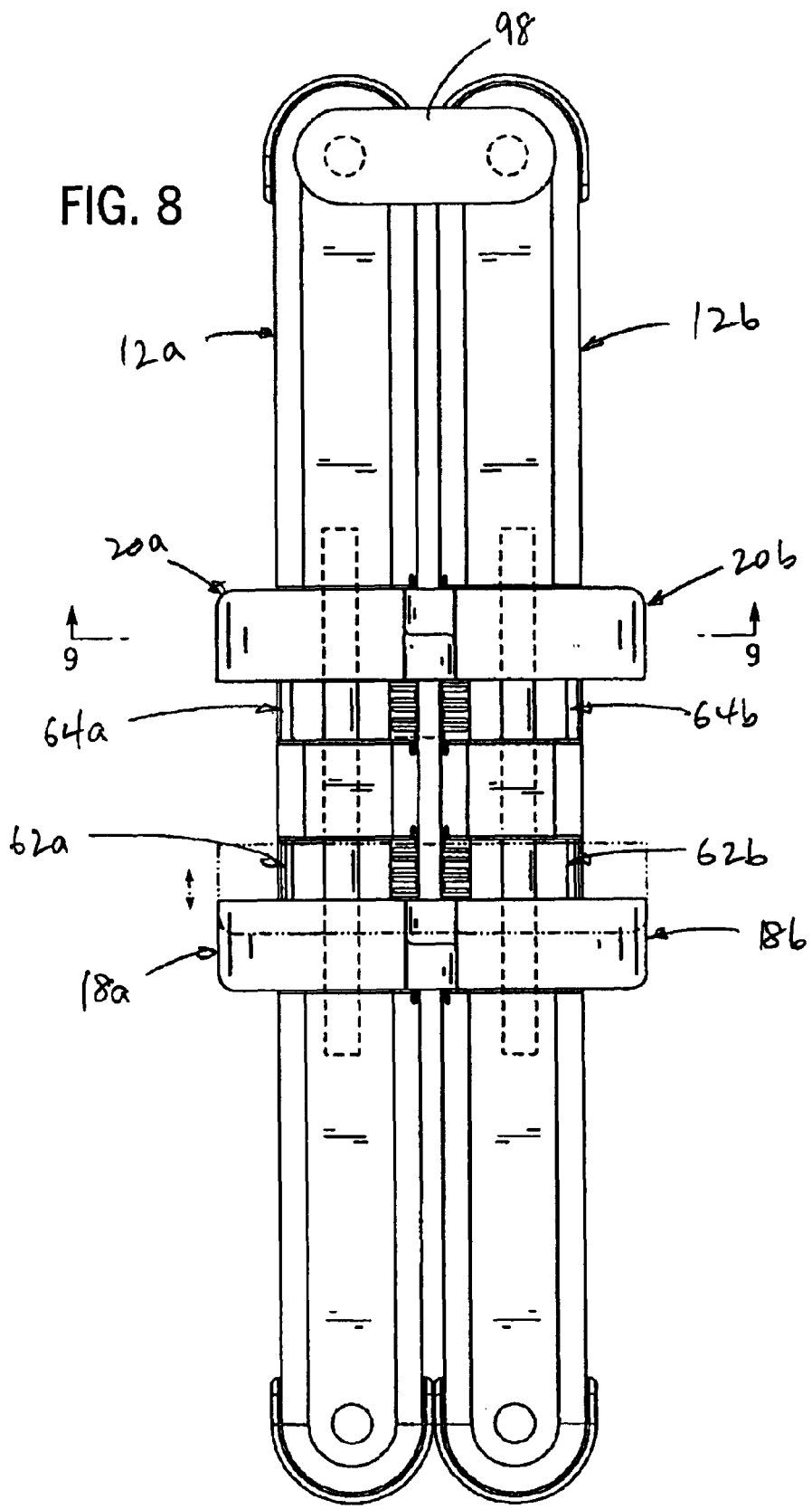

SUPPORT STAND FOR A BICYCLE

BACKGROUND AND SUMMARY OF THE INVENTION

This invention relates to a support or stand for supporting a bicycle or the like in an upright position.

It is common to utilize a kickstand for maintaining a bicycle or the like in an upright position when not in use. In many cases, however, a bicycle does not have a kickstand, such as when the bicycle is on display for sale or exhibition. In addition, most racing bicycles are not equipped with a kickstand. When not in use, such bicycles are typically leaned up against a support, such as a building or vehicle, or laid upon the ground. Either situation is undesirable and can result in damage to the bicycle. Stationary bicycle racks can be used to support such bicycles, but do not have the mobility required to support a bicycle when the bicycle is moved to various locations.

It is an object of the present invention to provide a stand or support for a bicycle or the like, which is adapted to be placed on the ground or other supporting surface for temporarily maintaining the bicycle in an upright position. Another object of the invention to provide such a stand or support which has a compact, lightweight design to facilitate storage and transportation from one location to another. It is a further object of the invention to provide such a stand or support which can be collapsed, so as to minimize the space occupied by the stand or support for storage and transportation. Yet another object of the invention is to provide such a stand or support which can be adjusted so as to allow use in connection with bicycles having tires of varying widths. Yet another object of the invention is to provide such a stand or support which is relatively simple in its construction and operation, and which is capable of being moved to various locations and reliably supporting the bicycle in an upright position.

In accordance with the present invention, a support for a bicycle or the like includes a pair of base members in combination with a pair of spaced apart support members that are pivotably connected with and extend upwardly from the base members. Each support member may be formed of a pair of sections which define upper ends that are pivotably interconnected with each other, for enabling each support member to be moved between a collapsed position and an extended position. In this manner, the support can be folded when not in use, e.g. for transport or storage, and unfolded for use.

An adjustment arrangement is interposed between at least one of the support members and each of the pair of base members, to enable the lateral spacing between the support members to be adjusted so as to accommodate different wheel widths. In the disclosed embodiment, the adjustment arrangement includes a laterally extending guide member associated with each base member, and the lower area of one of the support member sections is laterally movable via engagement with the guide member. A variable position engagement arrangement is interposed between the base member and the lower end of the support member section, for selectively fixing the lateral position of the support member relative to the base member. The variable position engagement arrangement is preferably in the form of engagement structure interposed between the lower end of the support member section and the base member to which the support member section is mounted. Each base member is movably mounted to the lower end of one of the support member sections, e.g. via a pivot connection, for movement between an operative locking position and an inoperative release position. When the base member is in the operative locking position, the variable position engagement arrangement is operable to prevent lateral movement of the support member section, to thereby fix the lateral spacing between the support members. When the base member is moved to its inoperative release position, the lateral position of the support member section can be adjusted relative to the base member so as to adjust the spacing between the support members. Subsequent return of the base member to its operative locking position functions to maintain the support members in the adjusted position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a top plan view of the bicycle support of FIG. 1;

FIG. 4 is an end elevation view of the bicycle support of FIG. 1;

FIG. 8 is a view similar to FIG. 3, showing the bicycle support in a collapsed position for transport or storage;

DETAILED DESCRIPTION OF THE INVENTION

Figure 1:
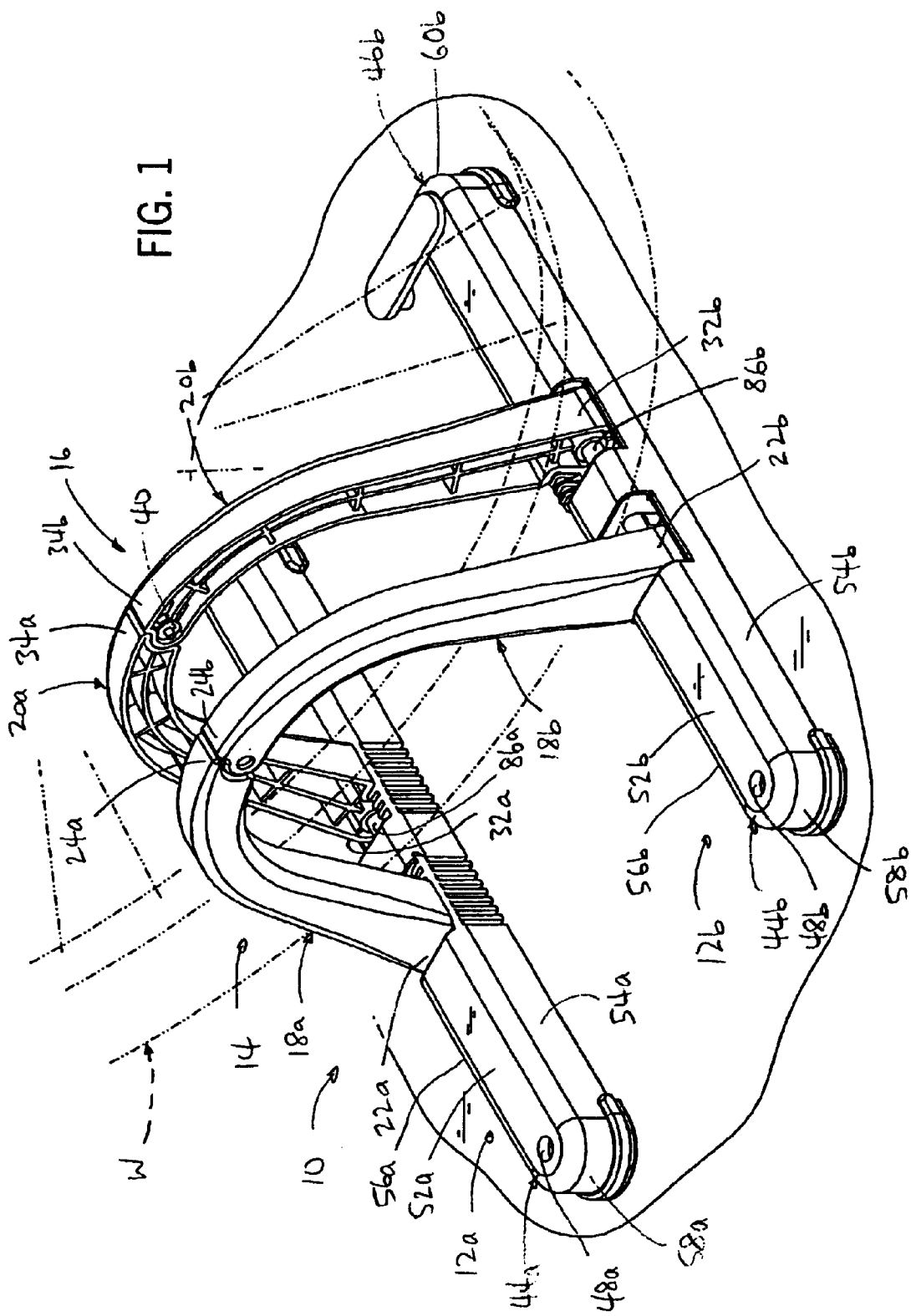
FIG. 1 is an isometric view of a stand or support for a bicycle or the like constructed in accordance with the present invention, showing the stand or support in an operative extended position.

Referring to FIG. 1, a stand or support 10 for a bicycle or the like generally includes a base arrangement and a pair of laterally spaced apart uprights which are adapted to receive one wheel (W) of a bicycle therebetween, for supporting the bicycle in an upright position. Support 10 can be used in any environment in which it is desired to support a bicycle or the like, such as for storage; display, packing in a garage or at a race site, etc.

The base arrangement of support 10 is in the form of a pair of identically constructed base members 12a, 12b, and the uprights of support 10 are in the form of a pair of mirror image support members 14 and 16 that are engaged with and extend upwardly from and between base members 12a, 12b. Support member 14 is made up of a pair of support member sections 18a, 18b, and support member 16 is made up of a pair of support member sections 20a, 20b. Base members 12a and 12b are adapted for engagement with a support surface such as the ground, a floor or the like, and bicycle wheel W is adapted to be placed between support members 14, 16 which are configured to engage the sides of bicycle wheel W so as to maintain the bicycle in an upright position.

Sections 18a, 18b of support member 14 include respective lower ends 22a, 22b and upper ends 24a, 24b. Upper ends 24a, 24b have respective ears 26a, 26b, each of which includes a laterally extending passage. Sections 18a and 18b are pivotably interconnected at their respective upper ends 24a, 24b by placing ears 26a, 26b adjacent each other such that the passages in ears 26a, 26b are aligned, and inserting a pivot pin 28 through the aligned passages for engagement with a pin receiver 30. Pin 28 thus defines an axis about which sections 18a, 18b of support member 14 are pivotable. In a similar manner, sections 20a and 20b of support member 16 include lower ends 32a, 32b, respectively, and upper ends 34a, 34b, respectively. Upper ends 34a, 34b define respective ears 36a, 36b, which have laterally extending passages adapted to receive a pivot pin 38 when ears 36a, 36b are placed adjacent each other, for engagement with a pin receiver 40. In this manner, support members 14, 16 are pivotable about aligned pivot axes defined by pivot pins 28, 38.

Base members 12a, 12b extend in a lateral direction and are axially spaced apart from each other. Base member 12a will be described in detail, with the understanding that the description applies equally to the construction of base member 12b and that the same reference characters are used for base member 12b as with base member 12a, but denoted with a designator "b" rather than "a".

Base member 12a includes a pair of spaced apart ends 44a, 46a. An upwardly facing opening 48a is located adjacent end 44a, and an upwardly facing opening 50a is located adjacent end 46a. Openings 48a, 50a are formed in a top wall 52a defined by base member 12a. An inner side wall 54a and an outer side wall 56a extend downwardly from top wall 52a, and end walls 58a, 60a are located at respective ends 44a, 46a of base member 12a.

Base member 12a includes a pair of spaced apart recessed areas, shown at 62a, 64a. Recessed area 62a is defined by an outer end wall 66a and an inner end wall 68a, in combination with an arcuate bottom wall 70a that extends between end walls 66a, 68a. In addition, recessed area 62a is defined by an inner side wall 72a having a series of outwardly facing teeth 74a.

Recessed area 64a of base member 12a is similarly constructed, including end walls 76a and 78a, arcuate bottom wall 80a and inner side wall 82a having teeth 84a.

A guide rod 86a extends laterally across recess areas 62a and 64a, and is received within slots formed in end walls 66a, 68a, 76a, and 78a. Guide rod 86a is engaged with base member 12a in any satisfactory manner, such as by mounting within recesses or passages formed in the underside of base member 12a. Guide rod 86a between end walls 66a and 68a, and between end walls 76a and 78a.

Lower end 22a of support member section 18a is received within recessed area 62a defined by base member 12a. A passage 90a is formed in lower end 22a, and the portion of guide rod 86a located in recessed area 62a extends through passage 90a. Similarly, lower end 32a of support member section 20a is received within recessed area 64a defined by base member 12a. A passage 92a is formed in lower end 22a, and the portion of guide rod 86a extending across recessed area 64a extends through passage 92a. In this manner, guide rod 86a is operable to guide lateral movement of lower end 22a of support member section 18a in recessed area 62a, and lateral movement of lower end 32a of support member section 20a in recessed area 64a.

Lower end 22a of support member section 18a includes a series of inwardly facing teeth 94a which are arranged and oriented to face inner side wall 72a of recessed area 62a. The spacing between teeth 94a is such that teeth 94a are engageable with and between teeth 74a formed on inner side wall 72a, such that teeth 94a and teeth 74a are capable of being meshed together. Similarly, lower end 32a of support member section 20a defines a series of teeth 96a which face inner side wall 82a of recessed area 64a. The spacing between teeth 96a is such that teeth 96a are engageable with and between teeth 84a formed on side wall 82a, such that teeth 96a and teeth 84a are capable of being meshed together.

Figure 5:
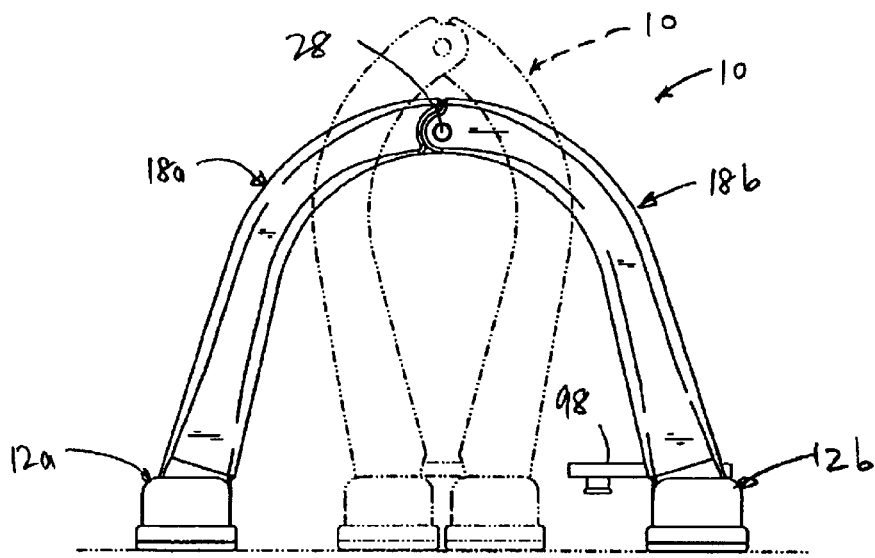
FIG. 5 is a side elevation view of the bicycle support of FIG. 1.
Figure 6A:
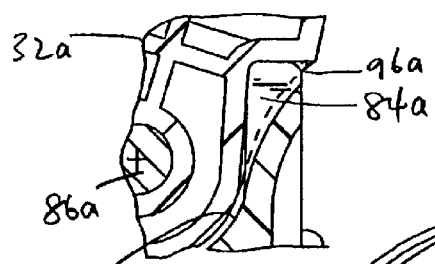
FIG. 6a is an enlarged partial section view with reference to line 6a—6a of FIG. 6.
Figure 6:
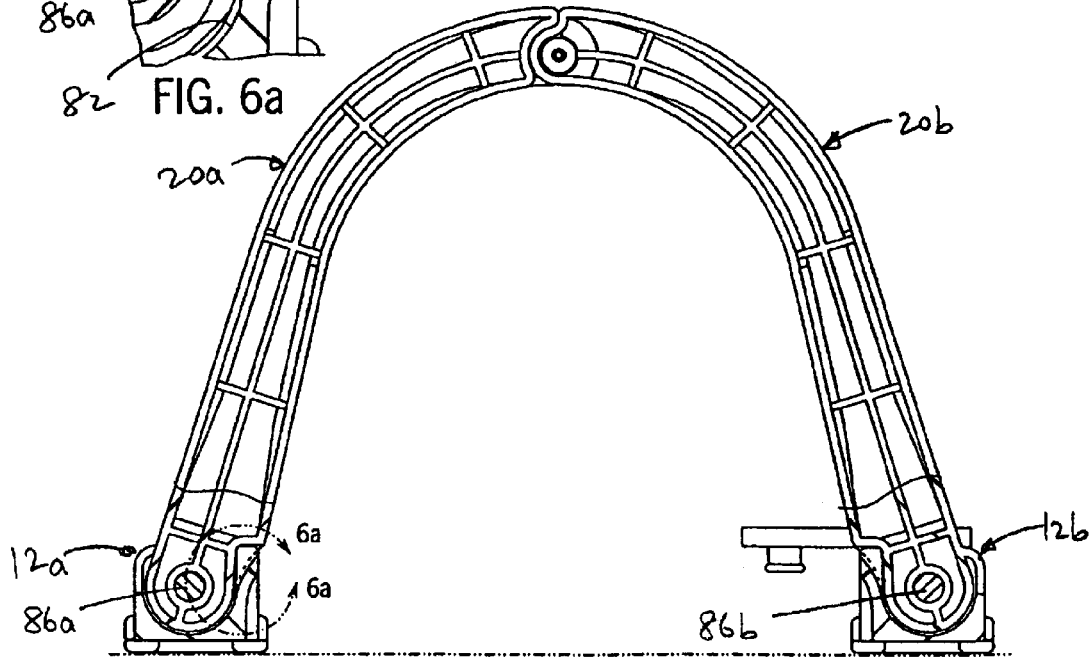
FIG. 6 is a section view taken along line 6—6 of FIG. 3.
Figure 7:
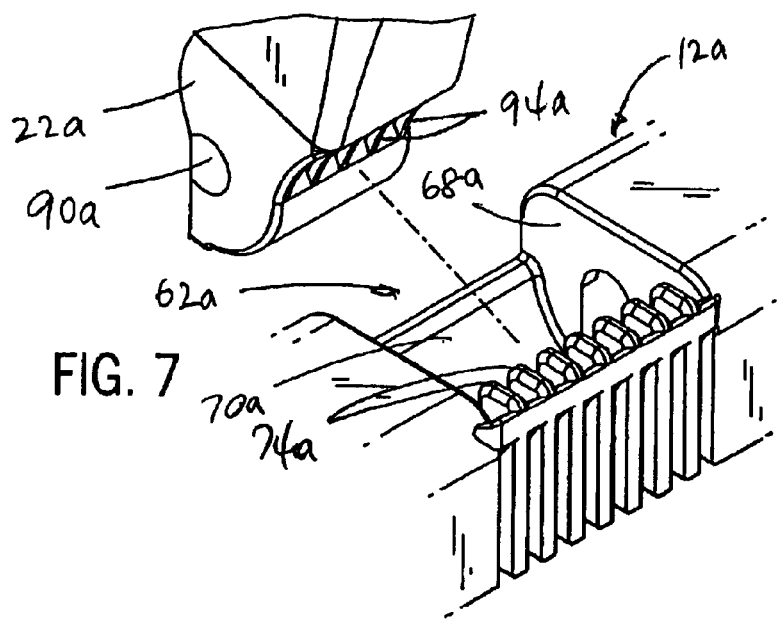
FIG. 7 is a partial isometric view illustrating portions of one of the base members and one of the support members incorporated in the bicycle support of FIG. 1.
Figure 10:
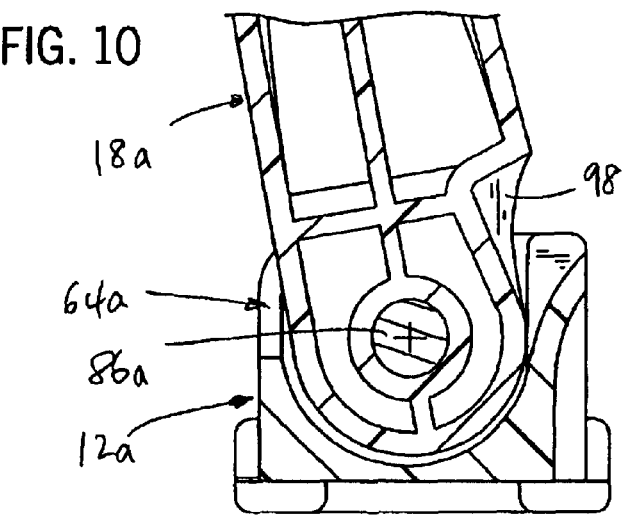
FIG. 10 is an enlarged partial section view showing one of the base members and one of the support members forming a part of the bicycle support of FIG. 1, and the manner in which the base member and the support member are disengaged for adjusting the spacing between the support members.
Figure 11:
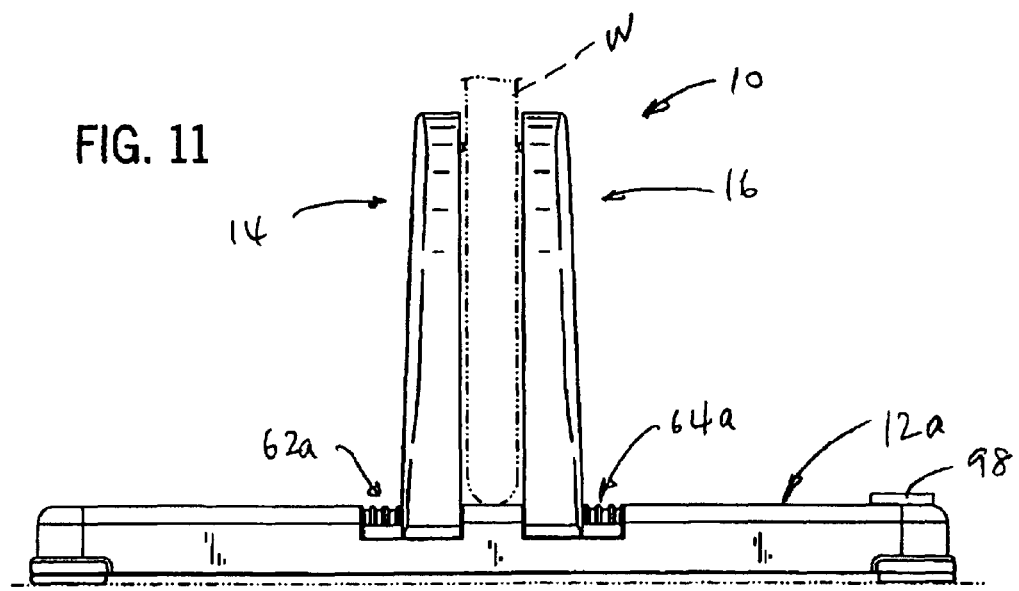
FIG. 11 is a view similar to FIG. 4, showing the support members moved together for accommodating a narrow bicycle wheel.

Guide rod 86 defines a pivot axis about which base member 12a can be pivoted between an operative or locked position and an inoperative or unlocked position. When base member 12a is in its operative position, as shown in FIGS. 5, 6 and 6a, teeth 94a on lower end 22a of support member section 18a mesh with teeth 74a on inner side wall 72a of recessed area 62a, to prevent lateral movement of support member section 18a relative to base member 12a. Similarly, placement of base member 12a in its operative position engages teeth 96a on lower end 32a of support member section 20a with teeth 84a of recessed area 64a, to prevent lateral movement of support member section 20a on guide rod 86a relative to base member 12a. When base member 12a is moved to its inoperative position as shown in FIG. 10 by pivoting base member 12a about guide rod 86a, teeth 74a are moved out of engagement with teeth 94a and teeth 84a are moved out of engagement with teeth 96a. Accordingly, when base member 12a is in its inoperative position, lower end 22a of support member section 18a can be moved on guide rod 86a within recessed area 62a, and lower end 32a of support member section 20a can be moved on guide rod 86a within recessed area 64a. End walls 66a and 68a define the range of movement of support member section 18a, and end walls 76a, 78a define the range of movement of support member section 20a.

As noted previously, base member 12b has the same construction as base member 12a as shown and described. Support member section 18b is a mirror image of support member section 18a (and is identical in construction to support member section 20a), and support member section 20b is a mirror image of support member section 20a (and is identical in construction to support member section 18a). In all cases, the same reference characters used in connection with base member 12a, support member section 18a and support member section 20a apply equally to base member 12b, support member section 18b and support member section 20b, respectively. On the drawings and in the following description, the same numerical reference characters will be used with respect to base member 12b and support members 18b, 20b as set forth in connection with base member 12a and support member sections 18a, 20a, respectively, with the substitution of "b" for "a" to denote reference to base member 12b and support members 18b, 20b, respectively.

In operation, support 10 functions as follows to support a bicycle or the like by engagement with the bicycle wheel W.

Figure 2:
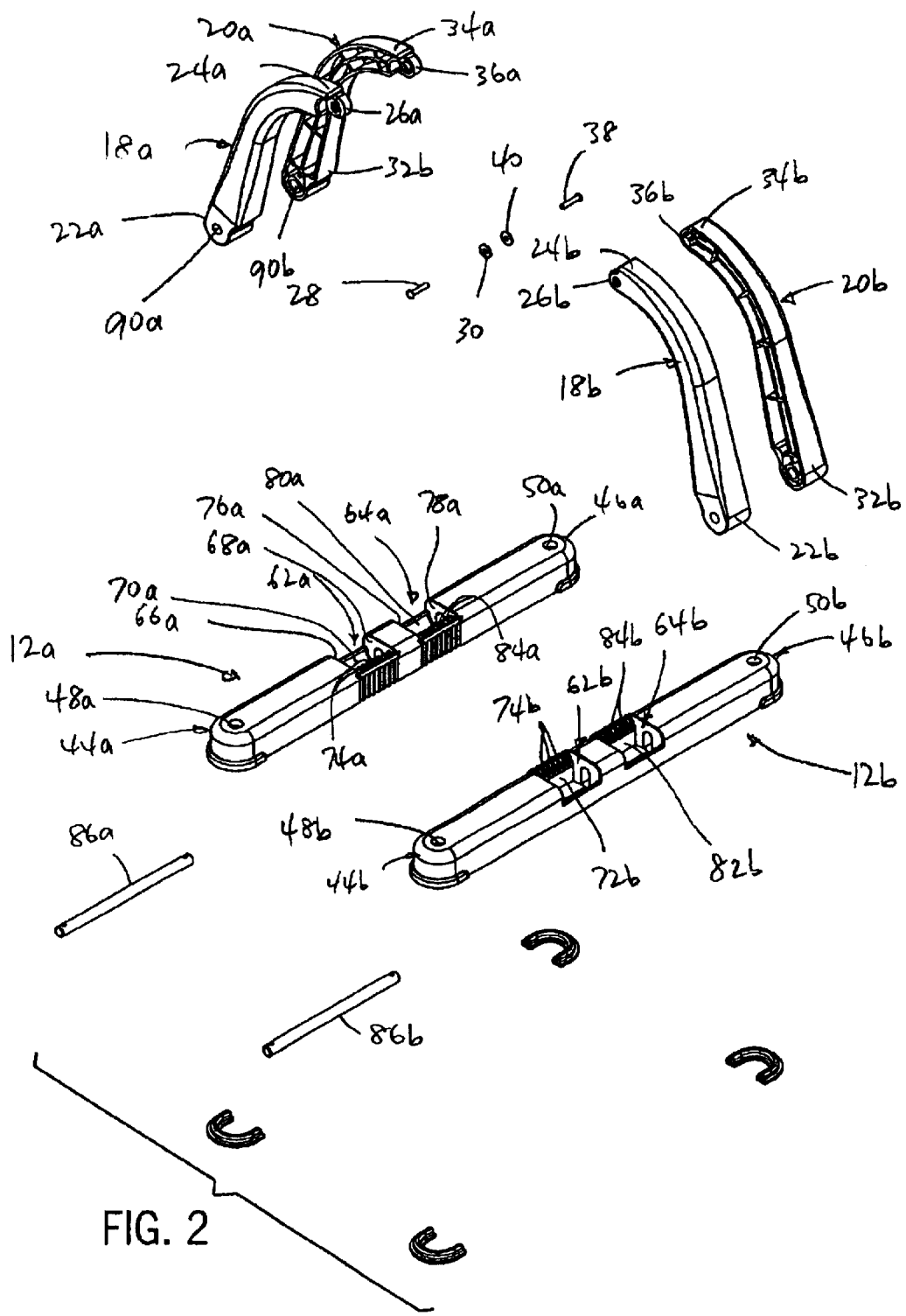
FIG. 2 is an exploded isometric view of the bicycle support of FIG. 1.

To support a bicycle or the like having a relatively wide wheel W, such as a mountain bike, support members 14 and 16 are positioned on guide rods 86a, 86b so as to be spaced apart from each other a maximum distance designed to receive a wide wheel W therebetween. Support member section 18a is positioned outwardly within recessed area 62a so as to engage lower end 22a of support member section 18a with recess end wall 66a. Similarly, support member section 20a is positioned outwardly in recessed area 64a such that the lower end 32a of support member section 20a engages recess end wall 78a of recessed area 64a. Support member sections 18b and 20b are similarly positioned in recessed areas 62b, 64b, respectively. Support member sections 18a, 20a and 18b, 20b are pivoted about pivot pins 28, 38 to the extended position as shown in FIGS. 1–3, and base members 12a, 12b are each placed in the operative position in which base members 12a, 12b are adapted to rest on a supporting surface S, which may be a floor, ground, pavement area or any other surface on which a bicycle is to be supported. The user positions wheel W of the bicycle between support members 14 and 16, which engage the sides of wheel W to maintain the bicycle in an upright position. The outer periphery of the bicycle tire is located between base members 12a and 12b, which prevent the bicycle wheel W from rolling. In this manner, the bicycle is maintained in an upright position in engagement with support 10.

In order to utilize support 10 in combination with a bicycle having a narrower wheel W, such as a racing bicycle, support members 14, 16 are moved together to narrow the space therebetween. To accomplish this, base member 12a is pivoted about guide rod 86a to the inoperative position of FIG. 10, to disengage support member section teeth 94a from base member teeth 74a and support member section teeth 96a from base member teeth 84a. Similarly, base member 12b is pivoted to the inoperative position to disengage support member teeth 94b from base member teeth 74b, and support member section teeth 96b from base member teeth 84b. Support member section 18a is then moved inwardly in recessed area 62a on guide rod 86a, either to a full inward position in which the inner surface of support member section 18a engages end wall 68a of recessed area 62a, or to any other desired position within recessed area 62a. Similarly, support member section 20a is moved inwardly on guide rod 86a to a desired position within recessed area 64a. When the desired spacing between support member sections 18a and 20a is attained, base member 12a is returned to its operative position by pivoting base member 12a about guide rod 86a, to engage support member section teeth 94a with base member teeth 74a and support member section teeth 96a with base member teeth 84a. Such engagement of teeth 94a with teeth 74a and teeth 96a with teeth 84a functions to maintain support member sections 18a and 20a in position relative to base member 12a, to secure the support member sections 18a and 20a in the desired lateral position to accommodate the narrower bicycle wheel W. Simultaneously with the adjustment in position of support member section 18a relative to base member section 12a, the position of support member section 18b relative to base member 12b is adjusted by placing base member 12b in the inoperative position and moving support member section 18b on guide rod 86b, so that support member section 18b is in the same lateral position relative base member 12b as support member section 18a relative to base member 12a. The position of support member section 20b is adjusted relative to base member 12b simultaneously with adjustment in the position of support member section 20a relative to base member 12a, to position support member section 20b in the same lateral position relative to base member 12b as support member section 20a relative to base member 12a. Base member 12b is then returned to its operative position to fix the lateral position of support member sections 18b and 20b. In this manner, the spacing between support members 14 and 16 is adjusted to accommodate a narrow bicycle wheel W.

Figure 9:
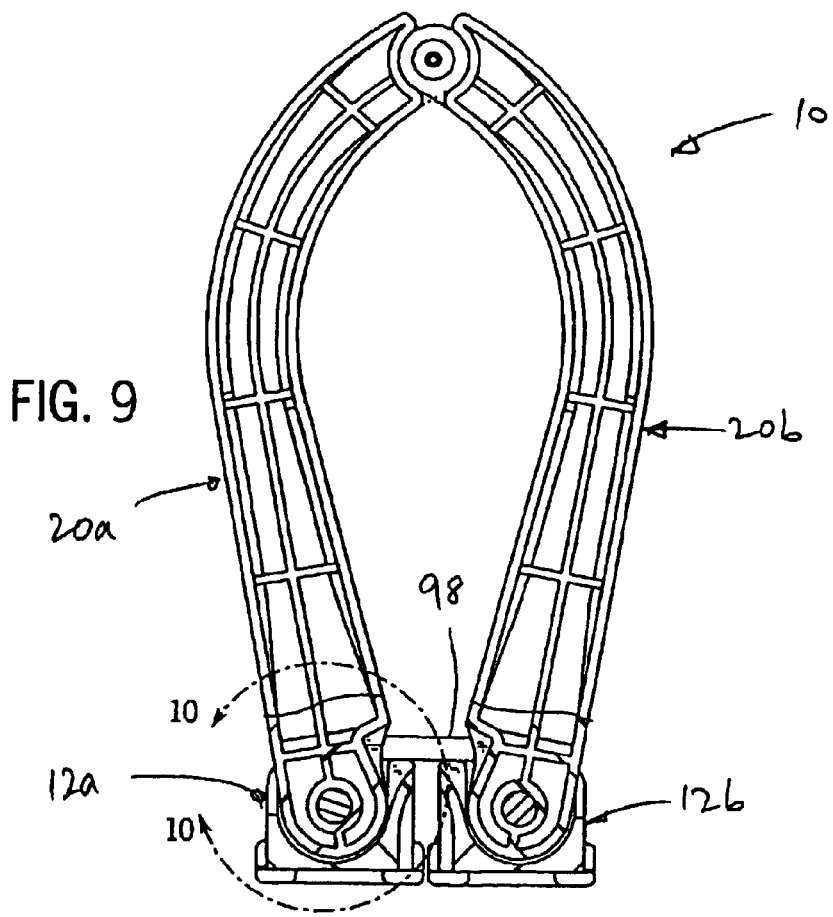
FIG. 9 is a section view taken along line 9—9 of FIG. 8.

In order to minimize the space occupied by support 10, such as during shipment, transport or storage, support members 14 and 16 are moved to the collapsed position, such as shown in phantom in FIG. 5 and as shown in FIGS. 8 and 9. In the collapsed position, support member sections 18a and 18b are pivoted together about pivot pin 28, and support member sections 20a and 20b are pivoted together about pivot pin 38, to move base members 12a and 12b together. The pivot connection of base members 12a and 12b to support members 14 and 16 provided by guide rods 86a and 86b, respectively, functions to position base members 12a and 12b in the inoperative position when support members 14 and 16 are collapsed in this manner. Accordingly, support members 14 and 16 can be adjusted relative to base members 12a and 12b when support 10 is collapsed, and subsequent movement of support members 14 and 16 to the extended position is thus operable to return base members 12a and 12b to the operative position so as to fix the lateral position of support members 14 and 16.

A connector 98 may be engaged within one of the openings in base member 12, such as in opening 50b as shown in FIG. 3. Connector 98 includes a tab that extends downwardly and is retained within opening 50b, to enable connector 98 to be pivoted relative to base member 12b. The opposite end of connector 98b also includes a downwardly extending tab, which can be engaged within opening 50a in base member 12a when support 10 is moved to its collapsed position. The tab in the free end of connector 98 is engaged with opening 50a in base member 12a so as to maintain support 10 in its collapsed position. In addition, connector 98 can be used when support 10 is in its extended position, to engage the opening in a base member of an adjacent support 10, so that the adjacent supports 10 can be secured together in an end-to-end fashion.

While the invention has been shown and described with respect to a specific embodiment, it is contemplated that numerous variations and alternatives are within the scope of the present invention. For example, and without limitation, the drawings illustrate both supports 14 and 16 as being laterally movable to adjust the space between the supports. It is also contemplated that only one of the supports may be laterally adjustable relative to the other, which may be fixed in position. Further, while the support members are shown as being pivotable on the same member that mounts the support members to the base members and which guides lateral movement of the support members relative to the base members, it is also contemplated that the support members may be guided on a member separate from the member that provides pivoting movement of the support members relative to the base members. Further, while the base members are shown as being pivotable between the operative and inoperative positions, it is also contemplated that the base members may be mounted to the support members using a sliding type of mounting arrangement or any other movable mounting arrangement which provides selective engagement and disengagement between the support members and the base members.

Various alternatives and embodiments are contemplated as being within the scope of the following claims particularly pointing out and distinctly claiming the subject matter regarded as the invention.

We claim:

1. A support for a bicycle having at least one wheel, comprising:

a pair of base members adapted for engagement with a supporting surface, wherein the base members are spaced apart from each other in an axial direction;

first and second support members configured to extend upwardly from the base members, wherein the support members define facing engagement surfaces that extend in the axial direction and are spaced apart from each other in a lateral direction, transverse to the axial direction, wherein the facing engagement surfaces of the support members cooperate to define an open wheel-receiving space therebetween; and an adjustable engagement arrangement interposed between at least the first support members and each of the base members, wherein the adjustable engagement arrangement is configured to provide adjustment in the position of the first support member relative to the second support member in the lateral direction to vary the width of the open wheel-receiving space between the first and second support members for accommodating bicycle wheels of different widths, while maintaining the first and second support members apart from each other to maintain the wheel-receiving space open, wherein the adjustable engagement arrangement is configured to selectively maintain the width of the open wheel-receiving space during movement of the bicycle wheel into and out of the open wheel-receiving space.

2. The support of claim 1, wherein each support member comprises a pair of pivotably interconnected sections, wherein the pivotably interconnected support member sections enable the support to be moved between an operative position in which the base members are moved apart from each other, and an inoperative position in which the base members are moved toward each other.

3. The support of claim 1, wherein an adjustable engagement arrangement is interposed between each of the support members and each of the base members.

4. A support for a bicycle having at least one wheel, comprising:

a pair of base members adapted for engagement with a supporting surface;

a pair of support members; and an adjustable engagement arrangement interposed between at least one of the support members and each of the base members, wherein the support members extend upwardly from the base members and are spaced apart from each other for receiving the bicycle wheel therebetween, and wherein the adjustable engagement arrangement is operable to adjust the space between the support members for accommodating bicycle wheels of different widths, wherein the adjustable engagement arrangement includes a guide member associated with each of the base members for guiding movement of a first one of the support members toward and away from a second one of the support members, and a variable position engagement arrangement interposed between the first support member and each of the base members for selectively fixing the position of the first support member relative to the base members.

5. The support of claim 4, wherein the variable position engagement arrangement comprises a movable connection between the first support member and each of the base members for providing movement of each base member between an operative position and an inoperative position relative to the first support member, and an engagement structure for fixing the position of the first support member relative to each base member when the base member is in the operative position, and for providing adjustment of the lateral position of the first support member relative to each base member when the base member is in the inoperative position.

6. The support of claim 5, wherein the movable connection between the first support member and each base member comprises a pivot connection for providing pivoting movement of each base member relative to the first support member between the operative and inoperative positions.

7. The support of claim 6, wherein the guide member associated with each base member comprises an elongated laterally extending guide rod, and wherein the first support member is pivotably engaged with the guide rod such that the guide rod defines the pivot axis about which the base member is movable between the operative and inoperative positions.

8. The support of claim 7, wherein each base member includes a recess within which a lower end defined by the first support member is received, and wherein the guide rod is located in the recess and the lower end of the first support member defines a passage through which the guide rod extends.

9. The support of claim 7, wherein the engagement structure comprises mating teeth associated with each base member and the first support member, wherein the mating teeth of the base member and the first support member are in engagement with each other when the base member is in the operative position and are disengaged from each other when the base member is in the inoperative position.

10. A support for a bicycle having at least one wheel, comprising:

a base arrangement;

a pair of support members, wherein each support member includes a pair of axially spaced apart lower ends and an upwardly extending engagement area therebetween, wherein the upwardly extending engagement areas of the support members cooperate to define a wheel-receiving space; and wherein the lower end of at least a first one of the support members is engaged with the base arrangement by a variable position engagement arrangement, wherein the variable position engagement arrangement is configured to provide adjustment of the lateral position of the first support member relative to a second one of the support members, wherein adjustment of the lateral position of the first support member relative to the second support member adjusts the lateral dimension of the wheel-receiving space between the engagement areas of the support members to accommodate different bicycle wheel widths.

11. The support of claim 10, wherein the base arrangement comprises a pair of separate base members.

12. A support for a bicycle having at least one wheel, comprising:

a base arrangement comprising a pair of separate base members; and a pair of support members, wherein each support member comprises a pair of pivotably interconnected support member sections, wherein each support member section defines an upper end and a lower end, wherein the lower ends of each pair of support member sections are axially spaced apart from each other and having an upwardly extending engagement area therebetween and are interconnected with the base members by a variable position engagement arrangement for adjusting the lateral position of a first one of the support members relative to a second one of the support members, to vary the lateral dimension of a space between the support members to accommodate different bicycle wheel widths, and wherein the upper ends of each pair of support member sections are pivotably interconnected with each other so as to enable the support members to be moved between a collapsed position in which the support member sections are moved together and an extended position in which the support member sections are moved apart.

13. The support of claim 12, wherein each base member includes a guide member and wherein the lower end of each section of the first support member is engaged with and laterally movable on the guide member of one of the base members.

14. The support of claim 13, wherein the lower end of a first one of the first support member sections includes a passage within which the guide member is received for guiding movement of the first support member section relative to the base member.

15. A support for a bicycle having at least one wheel, comprising:

a base arrangement comprising a pair of separate base members; and a pair of support members, wherein each support member includes a pair of axially spaced apart lower ends and an upwardly extending engagement area therebetween;

wherein each lower end of at least a first one of the support members is engaged with one of the base members by means of a variable position engagement arrangement for adjusting the position of the first support member in a lateral direction relative to a second one of the support members, to vary the lateral dimension of a space between the support members to accommodate different bicycle wheel widths, wherein the variable position engagement arrangement comprises mating engagement structures associated with each lower end of the first support member and each base member, and a movable connection between each base member and the associated lower end of the first support member for providing movement of each base member between an operative position in which the mating engagement structures associated with the base member and the lower end of the first support member are in an engaged position to fix the lateral position of the first support member relative to the base member, and a release position in which the mating engagement structures associated with the base member and the lower end of the first support member are disengaged so as to enable adjustment in the lateral position of the first support member relative to the base member.

16. The support of claim 15, wherein the movable connection between each lower end of the first support member and the associated base member comprises a pivot connection.

17. The support of claim 16, wherein each base member includes a guide rod and wherein one of the lower ends of the first support member is engaged with the guide rod, wherein the guide rod extends in the lateral direction and wherein the lower end of the first support member is movable on the guide rod for adjusting the position of the first support member in the lateral direction relative to the base member.

18. The support of claim 17, wherein the guide rod defines the pivot axis about which the base member is pivotable for movement between the operative and release positions.

19. The support of claim 17, wherein the base member defines a recess having a pair of end walls, wherein the guide rod extends through the recess between the end walls and wherein teeth are formed on a surface of the base member defining the recess, wherein the end walls of the recess engage the lower end of the first support member to define the range of lateral movement of the lower end of the first support member relative to the base member.

20. The support of claim 16, wherein the mating engagement structures comprises a series of laterally extending teeth formed on the lower end of the first support member and the associated base member.

* * * * *

UNITED STATES PATENT AND TRADEMARK OFFICE
CERTIFICATE OF CORRECTION

PATENT NO. : 6,868,976 B1
DATED : March 22, 2005
INVENTOR(S) : Todd W. Lassanske et al.

It is certified that error appears in the above-identified patent and that said Letters Patent is hereby corrected as shown below:

<u>Title page,</u>
Item [56], References Cited, OTHER PUBLICATIONS, please amend the second reference as follows:
after "Willworx Super Stands" delete "p. 106, The Hawley Company, undated" and substitute therefore -- www.willworx.com (4 pages ), February 5, 2003 --.

Signed and Sealed this

Twelfth Day of July, 2005

JON W. DUDAS
*Director of the United States Patent and Trademark Office*